(No Model.)

O. VON RODEN.
PROCESS OF CONDENSING AND PRESERVING MILK.

No. 376,495. Patented Jan. 17, 1888.

Witnesses:
Edw. F. Tourtellotte.
Charles MacInnes

Inventor
Otto Von Roden
By James A. Whitney
Attorney

UNITED STATES PATENT OFFICE.

OTTO VON RODEN, OF NEW YORK, N. Y., ASSIGNOR TO THE VON RODEN MANUFACTURING COMPANY, OF NEW YORK.

PROCESS OF CONDENSING AND PRESERVING MILK.

SPECIFICATION forming part of Letters Patent No. 376,495, dated January 17, 1888.

Application filed December 12, 1885. Serial No. 185,526. (No specimens.) Patented in England January 15, 1883, No. 227.

*To all whom it may concern:*

Be it known that I, OTTO VON RODEN, formerly of Hamburg, Germany, but now of the city, county, and State of New York, have invented certain Improvements in Processes for Preparing and Charging Milk, &c., with Carbonic Acid, (the said invention having been patented in England of date January 15, 1883, under No. 227,) of which the following is a specification.

This invention relates to the preservation of milk for long periods of time in a condition in which it retains all its essential and characteristic properties as a valuable article of food without any material detriment to its use for all the purposes for which fresh or sweet milk is ordinarily employed, my said invention being applicable to milk either in its original condition or to skimmed milk—that is to say, milk from which the cream has been removed in whole or in part. I effect the desired object in the manner and methods hereinafter set forth and particularized.

Figure 1:
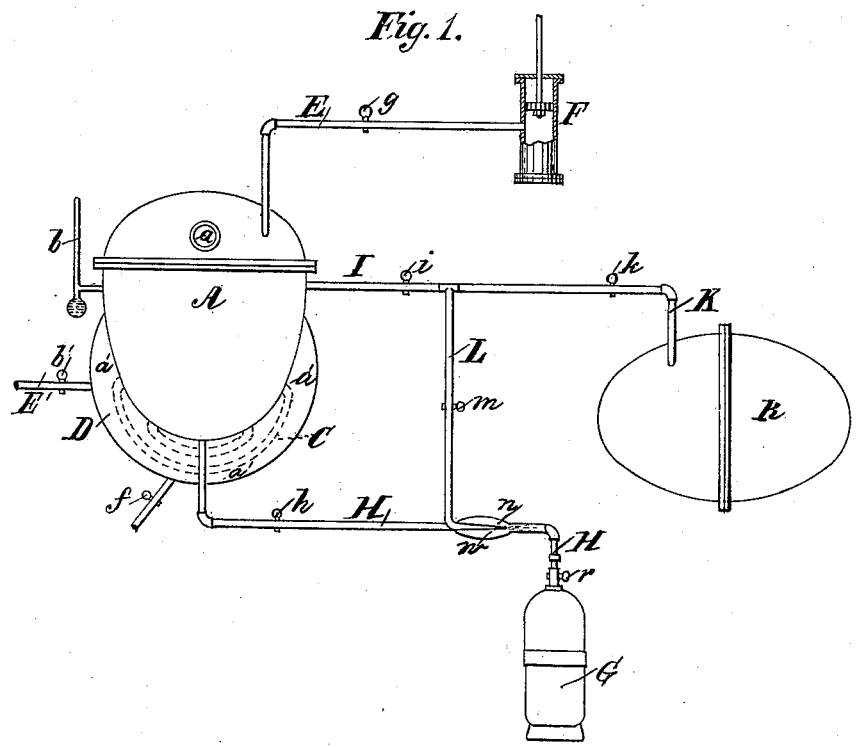
Figure 2:
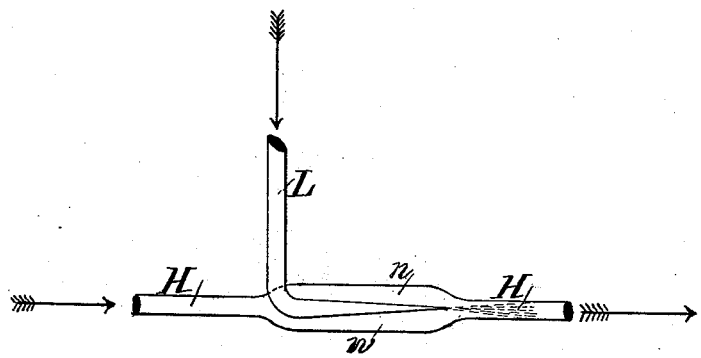

Figure 1 is a side view and partial vertical sectional view showing the construction and illustrating the operation of an apparatus which may be used in carrying into effect the process and methods of my said invention. Fig. 2 is a detail view, on a larger scale, of one part of said apparatus.

A is the vacuum-pan, which may be of any ordinary or suitable construction, and which may be provided with a glass window, $a$, through which the contents thereof may be inspected, and also with a thermometer or thermostat, $b$, of any suitable construction, by which the temperature within the vacuum-pan may be readily ascertained. The vacuum-pan may be heated by any ordinary or suitable means—as, for example, by the coil of steam pipes C.

D is an outer shell or jacket provided for the vacuum-pan A with a space, $a'$, between, within which space may be placed the coil of heating-pipes C aforesaid. An inlet-pipe, E', having a suitable cock, $b'$, is arranged to introduce cold water or other refrigerant into the space $a'$ when required, as hereinafter explained. The shell D should be provided with an outlet-cock, which may be of any suitable kind, in order that, when desired, the cold water or refrigerant may be permitted to flow or circulate through the space $a$. A cock, $f$, is so applied as to enable the water or refrigerant to be entirely withdrawn from the space $a$ when required. A pipe, E, provided, if desired, with a cock, $g$, connects the vacuum-pan A with the air-pump F, by means of which the vacuum or partial vacuum is maintained in the vacuum-pan.

G is a strong vessel or receiver, which may be of any ordinary or suitable construction, and which has a cock, $r$. The receiver G connects, by means of the pipe H, having a suitable cock, $h$, with the bottom of the vacuum-pan A.

I is a pipe which extends from the vacuum-pan and is continuous with an outlet-pipe, K, the outlet-pipe K being provided with a suitable cock, $k$, and the pipe I being also provided with a suitable cock, as at $i$. The pipe K connects with any suitable source for the supply of carbonic-acid gas,—as, for example, with a generator, R—which may be substantially the same as the generators which are in common use for the manufacture of carbonic-acid gas for various purposes in the arts.

The pipes I and K connect with the pipe H by a pipe, L, which has a suitable cock, $m$, and which is connected with the pipe H, as follows: In the pipe H is a hollow bulb or chamber, $n$. The end of the pipe L is passed through the side of this bulb $n$, and is turned to a position which should be parallel or coincident with the axis of said bulb or with that of the pipe H. This extremity of the pipe L is constructed to form an ejector-nozzle, $w$, having a fine or narrow orifice through which, on occasion, the carbonic-acid gas may issue at a high velocity and with great force, so as to carry with it the milk or other liquid simultaneously admitted to the bulb from the pan A to the receiver G. The carbonic-acid gas is thus brought into contact under pressure with the milk when the same is in a sprayed or minutely-divided condition, thereby effectually charging the milk with the gas.

The process and methods comprised in my said invention when the same is carried into effect by said apparatus is as follows: The milk to be treated is introduced into the vacuum-pan A through any suitable inlet, which is afterward closed in any ordinary or suitable manner. It is preferred that the vacuum-pan be filled to about two-thirds of its capacity. The cocks $i$ and $h$ being closed, the vacuum-pan, by means of the steam-pipes C or other suitable means, is heated to raise the milk to a temperature of, say, 180° Fahrenheit, and the air-pump F being meanwhile kept in operation to remove the vapors as fast as generated within the vacuum-pan, the contents of the latter are gradually and to some extent concentrated, this heating being continued for, say, a period of fifteen minutes, the object being to expel the air from the milk, so that its presence may not create fermentation or change. The concentrations to some extent of the milk, although tending to give a stronger and richer product, is a mere incident to the heating just described. When this heating has been accomplished and the elimination of the air has been secured, the cocks $i$ and $k$ are opened, while the cocks $m$ and $h$ are closed, to insure the passage of the carbonic-acid gas through the pipe I into the upper part of the vacuum-pan above the contents thereof, to exclude air from contact with the contents of the vacuum-pan. This done, the cock $g$ is closed and the heat is increased until the contents of the vacuum-pan are heated to a temperature of, say, 220° Fahrenheit, which temperature may be maintained for, say, about one hour, the object of this heating being to heat the milk to a temperature sufficient to destroy the germs contained in the milk, and which otherwise would tend to produce putrefactive fermentation. Steam is then turned off from the steam-pipes C in order to cease heating the vacuum-pan; or, if other means of heating the latter are used, the same are temporarily rendered inoperative in any suitable manner. The vacuum-pan is then cooled either by the admission of water or other refrigerant from the pipe E, as hereinbefore explained, or by any other appropriate means, this cooling being continued until the temperature of the contents of the vacuum-pan is reduced to 100° Fahrenheit, or thereabout. This done, the cocks $m$ and $h$ are opened, and the cock $r$ being opened the contents of the vacuum-pan A are ejected through the pipe H to the hollow bulb or chamber $n$, toward the receiver G, simultaneous with which the carbonic acid under pressure from the generator R passes through and from the nozzle $w$, and, dividing the milk into spray, charges the same and conveys it so charged into the receiver G, as hereinbefore explained.

Referring to the separate operations of expelling the air from the milk and of destroying the germs of fermentation therein, I find that the first operation must be effected immediately after the air has been expelled from the milk and from its containing-chamber. I find that the second or highest temperature must be effected after the gas has been admitted into the milk-containing chamber. I find that a heat high enough to destroy the fermenting germ in the milk, if used under the condition of a vacuum in the chamber, would change the color of the milk by acting upon the milk-sugar, so as to discolor the milk. I find that to charge the milk into the receiver under this highest degree of heat would act to prevent that intimate relation of the gas and milk which is necessary to cause the gas to be retained in the milk, and hence it is of the highest importance that the milk be cooled before it passes the ejector to fix the gas in the milk.

In the charging operation the pressure is equal in the preparing-vessel at the point of ejectment and mixing, and in the receiver to the pressure in the generator, so that the pressure in the generator serves to displace the prepared milk from its containing-vessel, and as the means of ejecting and mixing the milk and gas after it has been discharged from the preparing-vessel.

It is, of course, to be understood that any other suitable apparatus which will subject the milk to the treatment and conditions of my invention may be employed in the practice of my said invention in the place of that herein set forth.

When desired, sugar or other sweetening substance may be added to the milk, together with any desired flavoring material.

For the purposes of this application for Letters Patent I do not claim the apparatus or any part thereof herein described for the reason that I claim the said apparatus and its various essential features in a separate and distinct application for Letters Patent filed November 23, 1885, No. 185,527.

What I claim as my invention is—

1. The process substantially herein described of preserving milk, which consists in heating the same in a closed chamber to a temperature sufficient to expel the air from the milk, then producing a vacuum in said chamber by expelling the air eliminated from the milk, then introducing carbonic-acid gas into the said vacuum, and then raising the temperature of the milk to a degree sufficient to destroy the germs of fermentation therein before charging it.

2. The process substantially herein described of preserving milk, which consists in heating the same in a closed chamber to a temperature sufficient to expel the air from the milk, then producing a vacuum in said chamber by expelling therefrom the air eliminated from the milk, then introducing carbonic-acid gas into said vacuum, then raising the temperature of the milk to a degree sufficient to destroy the germs of fermentation therein, and finally lowering the temperature of the milk to prepare it for being charged.

3. The process substantially herein described of preparing and charging milk with carbonic-acid gas, which consists in subjecting the milk to the successive and continuous treatment as follows, to wit: the first treatment being under a heat limited to a degree sufficient to expel the air from the milk; the second treatment being in the presence of carbonic-acid gas under a degree of heat sufficient to destroy the germs of fermentation in the milk; the third treatment being under the action of a positive cooling agent, and, finally, charging the milk with carbonic-acid gas in its flow from the treating-chamber into the receiver after being cooled to effect the more intimate incorporation of the gas with the milk.

4. The process substantially herein described of preserving milk, which consists in subjecting the milk to heat in a closed chamber and expelling the air so liberated from the chamber, introducing carbonic-acid gas under pressure into said vacuum, increasing the heat of the chamber in the presence of the gas, then cutting off the heat, then reducing the temperature of the milk, and finally displacing the milk from the treating-chamber and ejecting it and mixing it after its expulsion from said chamber by means of the pressure in the generator.

OTTO VON RODEN.

Witnesses:
CHARLES MACINNES,
CLARENCE R. CONGER.